(No Model)
C. E. EMERY.
APPARATUS FOR LUBRICATING THRUST AND STEP BEARINGS UNDER PRESSURE.
No. 585,192. Patented June 29, 1897.
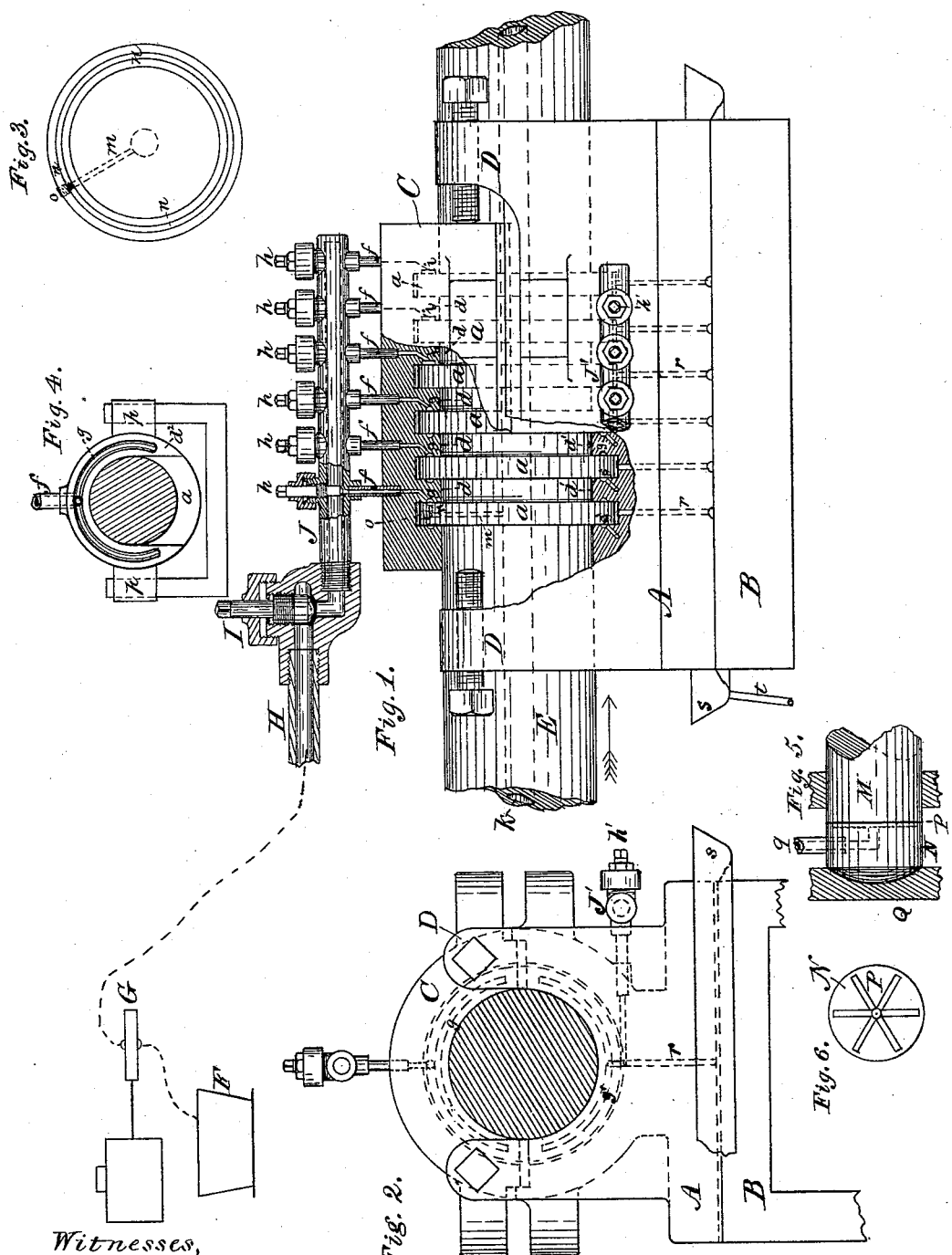
Witnesses,
George C. Pennell.
J. A. Ruoff.
Inventor,
Chas. E. Emery.

UNITED STATES PATENT OFFICE.

CHARLES E. EMERY, OF BROOKLYN, NEW YORK.

APPARATUS FOR LUBRICATING THRUST AND STEP BEARINGS UNDER PRESSURE.

SPECIFICATION forming part of Letters Patent No. 585,192, dated June 29, 1897.

Application filed February 12, 1891. Serial No. 381,164. (No model.)

*To all whom it may concern:*

Be it known that I, CHARLES E. EMERY, of the city of Brooklyn, county of Kings, and State of New York, have invented certain new and useful Improvements in Apparatus for Lubricating Thrust and Step Bearings with Lubricant Under Pressure, of which the following is a specification, reference being had to the accompanying drawings, forming a part hereof, wherein—

Figure 1 represents a longitudinal elevation, partly in section, of one form of thrust-bearing with my improvements attached. Fig. 2 represents an end elevation. Fig. 3 represents one of the thrust-rings of the shaft, showing an alternative method of supplying oil from a hollow in the shaft. Fig. 4 represents a cross-section of a thrust-bearing in which the thrust-plates are removable. Fig. 5 represents a side view of the step of a spindle to carry a heavy load, with its bearing in section; and Fig. 6 represents a face view of the thrust-plate for receiving such pressure.

This invention relates to special features of construction of apparatus for distributing lubricant under pressure to grooves or cavities in the bearing-surfaces of the recesses of a thrust-bearing and in the bearing-surfaces of the step of heavily-loaded shafts and spindles. The area of the bearing-surfaces is made sufficient to withstand the friction of any ordinary load with ordinary lubrication. With my attachment it is proposed to deliver oil or other lubricant under a sufficient pressure to the cavities or grooves in the recesses to either balance the maximum load or to increase the thickness of the film of lubricant between the bearing-surfaces, so as to reduce the friction to a minimum. My attachment is so arranged that lubricant under pressure can be supplied at any desired pressure to the system as well as to the bearing-surfaces, and means are also provided whereby the lubricant under pressure can more thoroughly spread over the bearing-surfaces by eliminating the pressure at certain points thereof.

To more particularly describe my invention with relation to the accompanying drawings, A represents the bed-plate of a thrust-bearing which is secured to a suitable support B, attached to the hull of the vessel.

C is the cap of the thrust-bearing and is adjustable longitudinally in relation to the bed-plate by set-screws in the lugs D D, attached to the latter.

E is the main shaft, provided with thrust-collars *a a*, formed or secured thereon and which engage in corresponding recesses in the portions A and C of said thrust-bearing. It is customary in this form of thrust-bearing, as the sides of the recesses wear, to shift the cap C longitudinally, so that the wear in going ahead, for instance, is taken in the recesses of the said cap-piece and the wear in going backward in the recesses of the bed-plate.

In the drawings it is supposed that the shaft is thrusting from left to right in going ahead, as shown by the arrow, and that the thrust is received at the right-hand side of the recesses in the cap C. Similarly, in going backward the thrust is received in the left-hand side of the recesses in the bed-plate A. Lubricant is provided in a tank F, from which it is received to a pumping device G and is delivered under pressure through a pipe (indicated by a dotted line) to the inlet H of the throttle-valve I, from which such lubricant under pressure is delivered through the manifold J to independent feed-pipes *f f*, which connect with the distributing cavities or grooves *g g* in the bearing-faces of the recesses of the cap-piece C, the admission of the lubricant to these supply-pipes, as well as its pressure, being regulated by independent throttle-valves *h*. The base-plate A is provided with appliances of a similar nature, a valve the duplicate of I, a manifold J', and valves *h'*, controlling the pressure and flow to the cavities or grooves *g'* in the recessess of the base-plate A.

In practice, and particularly when the parts are new, all the thrust-collars of the shaft may not bear upon the surface of the recesses of the bearing, or such a result may occur afterward if one of said collars or the surface against which it bears is for any reason cut or otherwise injured. In such a case the lubricant under pressure would escape with great rapidity from the cavities or grooves of the recesses not fully in contact. The quantity in many cases would be sufficient to reduce the pressure in the lubricant-supply system so that it would be insufficient to accomplish the purpose desired. The valves $h$ provide for this difficulty, for by them the supply to a leaky recess can be throttled. These valves also make it possible to supply an extra quantity of lubricant to any recess in which the collar is running warm. It may also be desirable to supply lubricant under pressure from a system that is supplying several pieces of mechanism, each possibly requiring a different pressure. This can be accomplished by adjusting the valve I so as to retain a supply in the manifold J under sufficient pressure for the thrust-bearing and yet not materially reduce the pressure in the general system. The surplus lubricant finds its way to the drip-pan $s$ through the drip-holes $r\ r$, penetrating the bed-plate A, and flows through a pipe $t$ directly to the supply-tank F or through a settling-pan from which it is pumped back to the tank F. This particular operation, however, is fully described in another application.

In revolving shafts working under heavy load it has been found in practice that great friction as well as wear resulted. To obviate this, I provide wide grooves $i\ i$ in the bearing-surfaces of the recesses and supply pressure to such a degree that the pressure of the lubricant from the pump, acting on the aggregate area of these grooves, will force the bearing-surfaces out of contact and force the thrust-collars of the shaft to run on a cushion of lubricant, which practically reduces the friction to a minimum. If, however, all the recesses were cut away as to their bearing-surfaces with the wide grooves referred to, the thrust-surface might be insufficient to carry the load should the pump-pressure be shut off, and said recesses might be injured by the motion under high unit-pressure. This is obviated by the fact that some of the recesses are constructed with sufficient bearing-surface so that the strain will be taken by the bearing-surfaces of these recesses and sufficient lubricant supplied by ordinary means. This idea can also be accomplished by providing sufficient bearing-surface in the recesses to withstand the strain and at the same time employing a higher pressure in the lubricant-cavities, so that the bearing-surfaces would be forced apart, or that the shaft thrust-collars would run on a film of lubricant, as in the previous case.

By bringing the portions A and C of the thrust-bearing close together at their juncture lubricant under pressure may be introduced from a hollow $k$ in the shaft, through the hole $m$, to the groove in the shaft-collar. (Shown in Fig. 3.) A small plug $o$ in the end of said groove $n$ may be used to throttle the supply of lubricant under pressure in the same manner as the valves $h$, with the exception that the adjustment cannot be made while the shaft is in motion.

The construction of the recesses may be varied, as shown in Fig. 4, by forming the thrust-plates of the cap C forked, so that they can be lifted out of the space between the collars $a\ a$, and by providing lugs $p\ p$ to engage in notches in the base-plate A to hold them in place. By this construction the independent feed $f$, as well as the valves $h$, can be employed, and great facility is experienced in cleaning or otherwise looking after the shaft-collars, as these plates can be very easily removed and replaced while the shaft is in motion. As to the arrangement of cavities or grooves, when the bearing-surface of the recesses is not continuous throughout the entire circumference, as in Fig. 4, where a notch is cut out, as described, or in Fig. 2, where the upper and lower portions are formed on the base-plate and cap, respectively, and the same somewhat separated, the lubricant cavities or grooves $g$ and $g'$ are not extended entirely to the juncture, but stop short of the same, as shown in Fig. 4 and by dotted lines in Fig. 2.

The lubrication from the grooves may at first only extend to a ring on the moving collar the width of the groove, but will gradually spread, particularly when the lubricant is scraped off, and thereby spread as the moving collar again meets the said groove after passing a break, and in this way the whole of the bearing-surfaces will become covered, forming a thin film, and the lubricant in the grooves or cavities under pressure will thicken this film, so as to reduce the friction. It is more advantageous to make the bearing-surfaces of each recess discontinuous at one point at least in its circumference, thereby removing the pressure of the lubricant at that point, as shown in Fig. 4, by the construction of the forked thrust-plate, and in Fig. 2 by separating the cap from the base. When the cap and base-plate are in one piece or bolted together so that their edges meet, this effect can be produced by cutting a groove across the faces of the recesses and terminating the lubricant cavities or grooves before they reach such cross-grooves. Such a construction is shown in dotted lines in Fig. 2.

My improvement may be attached to the end of a spindle carrying a heavy load, as in Fig. 5. M represents the end of said spindle, which bears upon a plate N, resting directly or through a ball-joint in the bed-plate Q. Lubricant is introduced under pressure at $q$ and is by suitable holes carried to the radial grooves shown in the bearing-face P of the plate N. The operation is the same as has been described in relation to thrust-bearings. With a sufficiently high pressure the spindle M may be lifted off its bearings by forcing lubricant under a sufficiently high pressure into the grooves.

Another important feature resultant from experience in this method of lubrication I have discovered in the case of an ordinary journal, that the lubricant-pressure may, after motion of the shaft has been established, be reduced to or even below the pressure on the bearing-surfaces due to the load, as it is only required to supplement the pressure due to the entraining of the lubricant by the motion of the surfaces by sufficient lubricant-pressure in the grooves to secure a pressure in the thickened film due to both causes equal to the unit-pressure, or which when extended over the whole effective bearing-surface will support the load.

Having now described my invention, what I claim is—

1. In an apparatus for lubricating a thrust-bearing with lubricant under pressure, the combination of a collared shaft, a thrust-block recessed to fit the same, one set of recesses being provided with large cavities or grooves for maintaining a fluid film under pressure between the bearing-surfaces, another set of recesses provided with smaller grooves and with sufficient bearing-surface to sustain the strain when lubricant not under pressure is employed, independent lubricant connections to said cavities or grooves, valves in each of said connections to independently regulate the pressure and flow of the lubricant, substantially as set forth.

2. In an apparatus for lubricating a thrust-bearing with lubricant under pressure, the combination of a collared shaft, a thrust-block recessed to fit the same, one set of recesses being provided with large cavities or grooves for maintaining a fluid film under pressure between the bearing-surfaces, another set of recesses being provided with smaller grooves and a sufficient bearing-surface to sustain the strain when lubricant not under pressure is employed, independent lubricant connections to said cavities or grooves, valves in each of said connections to independently regulate the pressure and flow of the lubricant, a supply and regulating valve controlling the pressure and flow to the system, substantially as set forth.

3. In an apparatus for lubricating a thrust-bearing with lubricant under pressure, the combination of a shaft, a block recessed to fit the same, one set of recesses being provided with large cavities or grooves for maintaining a fluid film under pressure between the bearing-surfaces, another set of recesses provided with smaller grooves and with sufficient bearing-surface to sustain the strain when lubricant not under pressure is employed, substantially as set forth.

4. A thrust-bearing consisting of a lubricant-pressure device, a shaft provided with collars, a bearing recessed to fit the same, one set of said recesses being provided with large cavities or grooves, $i$, for maintaining a fluid film under pressure between the bearing-surfaces, another set of recesses provided with smaller cavities or grooves, $g$, and with sufficient bearing-surface to sustain the strain when lubricant not under pressure is employed, and means for eliminating the pressure in said cavities or grooves and more effectually spreading the lubricant, substantially as set forth.

5. In an apparatus for lubricating thrust-bearings with lubricant under pressure, the combination of a shaft E provided with collars $a$, recesses in the base A and recesses in the cap C, each provided with lubricant-distributing cavities or grooves $g$, $g'$, extending over a part of their bearing-surface against which the collars $a$ revolve, said base A and cap C being separated to permit the better spreading of the lubricant impelled by pressure on the revolving surfaces, independent lubricant connections $f$, valves $h$, $h'$ for regulating the pressure and flow to each set of cavities or grooves, a valve I for regulating the pressure and flow to the system, and a drip-pan $s$, substantially as set forth.

CHAS. E. EMERY.

Witnesses:
GEO. C. PENNELL,
J. A. RUOFF.